US012687151B2

(12) United States Patent
Chatelain

(10) Patent No.: US 12,687,151 B2
(45) Date of Patent: Jul. 21, 2026

(54) WIND TURBINE

(71) Applicant: Paul J Chatelain, Kerrville, TX (US)

(72) Inventor: Paul J Chatelain, Kerrville, TX (US)

( * ) Notice: Subject to any disclaimer, the term of this patent is extended or adjusted under 35 U.S.C. 154(b) by 0 days.

(21) Appl. No.: 18/960,203

(22) Filed: Nov. 26, 2024

(65) Prior Publication Data

US 2026/0146582 A1 May 28, 2026

(51) Int. Cl.
*F03D 3/06* (2006.01)
*F03D 3/00* (2006.01)

(52) U.S. Cl.
CPC .............. *F03D 3/068* (2013.01); *F03D 3/005* (2013.01); *F03D 3/061* (2013.01); *F03D 3/063* (2023.08); *F05B 2240/215* (2013.01)

(58) Field of Classification Search
CPC .......... F03D 3/005; F03D 3/009; F03D 3/061; F03D 3/062; F03D 3/063; F03D 3/066; F03D 3/067; F03D 3/068; F05B 2240/215
See application file for complete search history.

(56) References Cited

U.S. PATENT DOCUMENTS

| 1,578,835 | A | * | 3/1926 | Kothe | ................... | F03B 17/063 |
| | | | | | | 416/197 A |
| 3,499,183 | A | * | 3/1970 | Parsons | ..................... | E05D 5/10 |
| | | | | | | 16/273 |

| 4,303,835 | A | | 12/1981 | Bair | | |
| 6,740,989 | B2 | * | 5/2004 | Rowe | ...................... | F03D 80/70 |
| | | | | | | 415/4.4 |
| 7,083,382 | B2 | | 8/2006 | Ursua | | |
| 7,677,862 | B2 | | 3/2010 | Boatner | | |
| 9,080,556 | B2 | | 7/2015 | Xu | | |
| 9,133,823 | B2 | | 9/2015 | Jaw | | |
| 2003/0049128 | A1 | | 3/2003 | Rogan | | |
| 2008/0260532 | A1 | | 10/2008 | Luethi | | |
| 2012/0195759 | A1 | * | 8/2012 | Feldhaus | ................. | F03D 3/067 |
| | | | | | | 416/117 |
| 2015/0016997 | A1 | | 1/2015 | Yu | | |
| 2016/0222943 | A1 | * | 8/2016 | Nicklas | ..................... | F03D 7/06 |
| 2017/0241403 | A1 | * | 8/2017 | Spencer | .................. | F03D 13/20 |

* cited by examiner

*Primary Examiner* — Elton K Wong
(74) *Attorney, Agent, or Firm* — AGK Patent & Trademark Law; Philip Y Kim

(57) ABSTRACT

Embodiments of the present invention may comprise a wind turbine including a plurality of sails configured in a circular pattern about a vertical hub. A center axis of rotation extends vertically through the hub and the sails face perpendicularly to the hub. Each of the sails is preferably held within a sail frame. Each sail frame is hingedly connected to an outrigger connected portion to pivot about a sail axis. Wind contacting a face of one of the sails causes the sail and sail frame to rotate relative to its outrigger connected portion about the sail axis. Further rotation of the sail and sail frame causes the outrigger connected portion to rotate about the center axis causing the hub to rotate about the center axis. The hub is mechanically coupled to a generator whereby rotation of the hub causes the generator to generate electricity.

19 Claims, 10 Drawing Sheets

WIND TURBINE

BACKGROUND OF THE INVENTION

The present invention relates to wind turbines. Wind turbines are used to convert energy from wind into electrical power. This is generally achieved by using a plurality of turbine blades that are configured to rotate about a common axis of rotation. The turbine blades rotate when confronted by wind moving perpendicular to the common axis of rotation. Some pitfalls of common wind turbines are inefficiency in weak winds and safety concerns in high winds. Another pitfall of common wind turbines is limited ability to operate when wind is blowing from different directions.

BRIEF SUMMARY OF THE INVENTION

The present invention addresses the above and other needs by providing a wind turbine having. The wind turbine includes a plurality of sails configured in a circular pattern about a vertical hub. A center axis of rotation extends vertically through the hub and the sails face perpendicularly to the hub. Each of the sails is preferably held within a sail frame. Each sail frame is hingedly connected to an outrigger connected portion to pivot about a sail axis. Wind contacting a face of one of the sails causes the sail and sail frame to rotate relative to its outrigger connected portion about the sail axis. Further rotation of the sail and sail frame causes the outrigger connected portion to rotate about the center axis causing the hub to rotate about the center axis. The hub is mechanically coupled to a generator whereby rotation of the hub causes the generator to generate electricity.

In accordance with one aspect of the invention, there is provided an embodiment of the present invention comprise a wind turbine with a hub and a center axis of rotation configured through the hub. The center axis of rotation may be configured vertically such that the wind turbine is powered by wind that blows at least partially horizontally. At least one sail may be connected to the hub by an outrigger. A sail frame of the outrigger may surround a perimeter of the sail and may serve to hold the sail to the outrigger.

In accordance with another aspect of the invention, there are provided sails having a concave face and a convex face. When wind contacts the concave face of a sail, the sail may be opened from a closed position to an open position. When the sail is in the open position, the wind may continue to contact the concave face of the sail to cause the sail to rotate about the center axis of rotation, causing the hub to rotate about the center axis of rotation.

In accordance with yet another aspect of the invention, there is provided a hub mechanically coupled to a generator. Rotation of the hub about the center axis of rotation rotates a rotor of the generator. The rotor is configured concentrically to a stator, which may comprise one or more coils. One or more magnets are attached to the rotor. When the rotor rotates, the magnets of the rotor move relative to the one or more coils of the stator, thereby inducing an electrical current in the one or more coils, thereby generating electricity from the wind. The generated electricity may then be transferred to power lines or other hardware used for transmitting and/or storing electricity.

In accordance with still another aspect of the invention, there is provided a rotation of the sails about the center axis of rotation when wind contacts the convex face of the sail. The wind forces the sail to close from an open position into a closed position. A retraction mechanism is connected to the sail frame of each sail and is in tension when the sail is in the open position. The tension of the retraction mechanism aids in closing the sail from the open position to the closed position. The retraction mechanism may be a strap. The strap may be made of any material. In preferred embodiments, the strap is made of a flexible material such as but not limited to canvas or nylon.

In accordance with another aspect of the invention, there is provided at least one sail having an outer sail and an inner sail. The inner sail is attached to the same outrigger as the outer sail. The inner sail resides closer to the hub than the outer sail and may be connected to the wind turbine by an inner sail frame that may be a part of the outrigger. The outer sail may be connected to the wind turbine by an outer sail frame that may be a part of the outrigger. Both the inner sail and the outer sail may have a concave face and a convex face. The concave faces of the inner sail and outer sail may be configured such that both the concave faces of the inner sail and outer sail are facing the wind at the same time. The convex faces of the inner sail and outer sail may be configured such that both the convex faces of the inner sail and outer sail are directed away from the wind at the same time.

In accordance with another aspect of the invention, there is provided a plurality of grommets configured about a perimeter of the at least one sail. The grommets may be made of any material. In preferred embodiments, the grommets are made of a rigid material such as but not limited to brass, stainless steel, or high-density polyethylene. Each of the plurality of grommets may encircle an aperture in the at least one sail.

In accordance with still another aspect of the invention, there is provided plurality of non-pressure clips connecting some of the plurality of grommets to the sail frame. The plurality of non-pressure clips may be designed such that they form a permanent connection between their respective grommets and the sail frame. A plurality of pressure clips may connect some of the plurality of grommets to the sail frame. The plurality of pressure clips may be designed such that when the wind contacts the concave face of the at least one sail with a certain force, the plurality of pressure clips disconnect from their respective grommets. In this manner, "high winds" (winds that contact the at least one sail with sufficient force to disconnect the pressure clips) may cause the at least one sail to "flap" on the sail frame but not to rotate about the center axis of rotation.

In accordance with yet another aspect of the invention, there is provided a sail frame connected to an outrigger by a hinge. In embodiments including an inner sail and an outer sail, the outer sail frame may be connected to the inner sail frame by the hinge. In these embodiments, the inner sail frame may serve as the outrigger connected portion. The hinge may rotatably connect the sail frame to the outrigger connected portion such that the sail frame may rotate relative to the outrigger connected portion, which allows the sails of the wind turbine to move between open and closed positions. The outrigger connected portion is connected to the hub whereby when the outrigger connected portion rotates about the center axis of rotation, the hub also rotates about the center axis of rotation.

In accordance with another aspect of the invention, there is provided a hinge comprising a hinge bushing that may reduce the friction of the hinge when the sail frame rotates relative to the outrigger connected portion. The hinge bushing may be made of any material including but not limited to nylon, polyamide, or polypropylene. The kinetic coefficient of friction between the hinge bushing and other hinge components that contact the hinge bushing may be anywhere in the range of 0.2-0.6, inclusive.

In accordance with yet another aspect of the invention, there is provided at least one outrigger support ring fixed to each outrigger connected portion of the outriggers. The at least one outrigger support ring may provide structural support to the outrigger connected portions so that they do not bend or break in high winds. The at least one outrigger support ring may rotate about the center axis of rotation with the outrigger connected portions.

In accordance with another aspect of the invention, there is provided at least one sail having a main portion with a main portion curvature and a sail extension with a sail extension curvature. When the at least one sail is in the closed position, the main portion may reside within a diameter of rotation, and the sail extension may protrude from the diameter of rotation. The main portion curvature and the sail extension curvature may both curve in the same direction. Alternatively, the main portion curvature and the sail extension curvature may curve in opposite directions. The sail extension curvature is not limited to a curve with a radius and instead may be a straight line.

In accordance with still another aspect of the invention, there is provided sails having a closed position, the protrusion of the sail extension from the diameter of rotation may allow the wind to contact the concave face of the sail extension. In this manner, the wind turbine may continue to operate even when all of the sails are in closed positions.

In accordance with another aspect of the invention, there is provided a wind turbine having at least four sails, at least six sails, at least eight sails, or any number of sails. The sails may be made of any material. In preferred embodiments, the sails are made of a flexible material such as but not limited to canvas, low-density polyethylene, or nylon.

In accordance with yet another aspect of the invention, there is provided a wind turbine having pairs of sails comprising a first sail and second sail. The pairs of sails may be two or more pairs of sails, three or more pairs of sails, four or more pairs of sails, or any number of pairs of sails. The first sail and the second sail may be configured at opposite sides of the hub from one another. The sail frames of the first sail and the second sail may be connected by a retraction mechanism. The retraction mechanism may have a first retraction portion and a second retraction portion rotatably connected to the first retraction portion. A drop bar may be configured between the first retraction portion and the second retraction portion. The drop bar may prevent the first retraction portion and the second retraction portion from rotating towards one another.

In accordance with another aspect of the invention, there is provided a wind turbine having sails wherein when the wind contacts the concave face of the first sail, the first sail may be configured to open into an open position. The first sail frame may pull on the first retraction portion, which may pull on the second retraction portion, which may pull on the sail frame of the second sail of the pair. This may aid in closing the second sail into the closed position. When the wind contacts the convex face of the first sail, the first sail may be configured to close into a closed position. The first sail frame may push on the first retraction portion, which may push on the second retraction portion, which may push on the sail frame of the second sail. This may aid in opening the second sail into the open position.

In accordance with another aspect of the invention, there is provided a wind turbine having tension springs configured between the first retraction portion and the second retraction portion. The tension springs draw the first retraction portion and the second retraction portion together and a drop bar limits the first retraction portion and the second retraction portion moving together past an open position. When wind contacts the concave face of the first sail with a sufficient force, the first sail may open past the open position, causing the first retraction portion to rotate away from the second retraction portion, releasing the drop bar so that the drop bar no longer prevents the first retraction portion and the second retraction portion from rotating towards one another. This allows the first retraction portion and the second retraction portion to rotate towards one another, which causes the first sail and the second sail to move to a closed position.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

The description provided herein describes example embodiments of the present invention and is not intended to limit the invention to any particular feature, component, shape, size, design, material, use, function, or any other property. Furthermore, the drawings provided herein show example embodiments of the present invention and are not intended to limit the invention to any particular feature, component, shape, size, design, material, use, function, or any other property.

Figure 1:
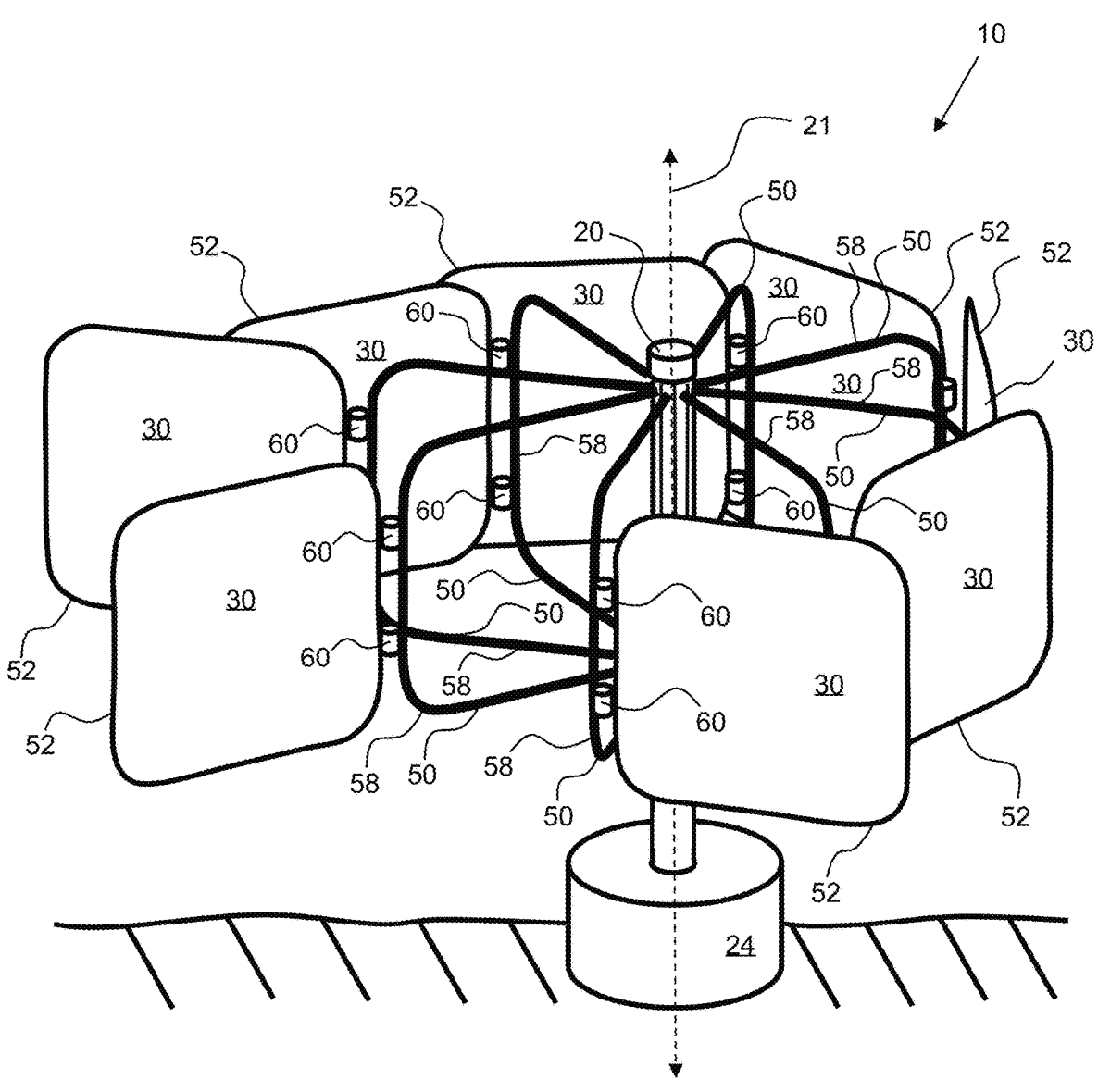
FIG. 1 shows a top perspective view of a wind turbine according to embodiments of the present invention.

As shown in FIG. 1, eight sails 30 are connected to a hub 20 of a wind turbine 10 by outriggers 50. Each outrigger 50 is connected to a sail frame 52 that surrounds a perimeter of a respective sail 30, and an outrigger connected portion 58 that connects the sail frame 52 to the hub 20. Each outrigger connected portion 58 is connected to its corresponding sail frame 52 by at least two hinges 60, or by one long hinge, that allow the sail frame 52 to rotate relative to the outrigger connected portion 58. The sail frames 52 are restricted or biased to extend directly from, or align substantially with, the outriggers 50 and to fold in only one direction towards the out riggers 50, thereby rotating the hub 20 when wind bears against the wind turbine 10.

The outrigger connected portions 58 are rigidly connected to the hub 20. The hub 20 is oriented to rotate about a center axis of rotation 21 that extends through the hub 20, and the sails 30 reside in planes generally perpendicularly to the center axis of rotation 21 and the hinges 60 have axes generally parallel with the center axis of rotation 21. When the sails 30 catch wind, the sails rotate about the hub 20 and cause the hub 20 to rotate about the center axis of rotation 21. Rotation of the hub 20 powers a generator 24 which is shown at a bottom end of the hub 20 in FIG. 1, however the generator 24 may be connected to the wind turbine 10 in other manners and come within the scope of the present invention. For example, the generator 24 may be configured at either end of the hub 20. Alternatively, the generator 24 may be offset from the hub 20 and may be mechanically connected to the hub 20 via a drivetrain, a belt, a chain, or any mechanical linkage.

Figure 2:
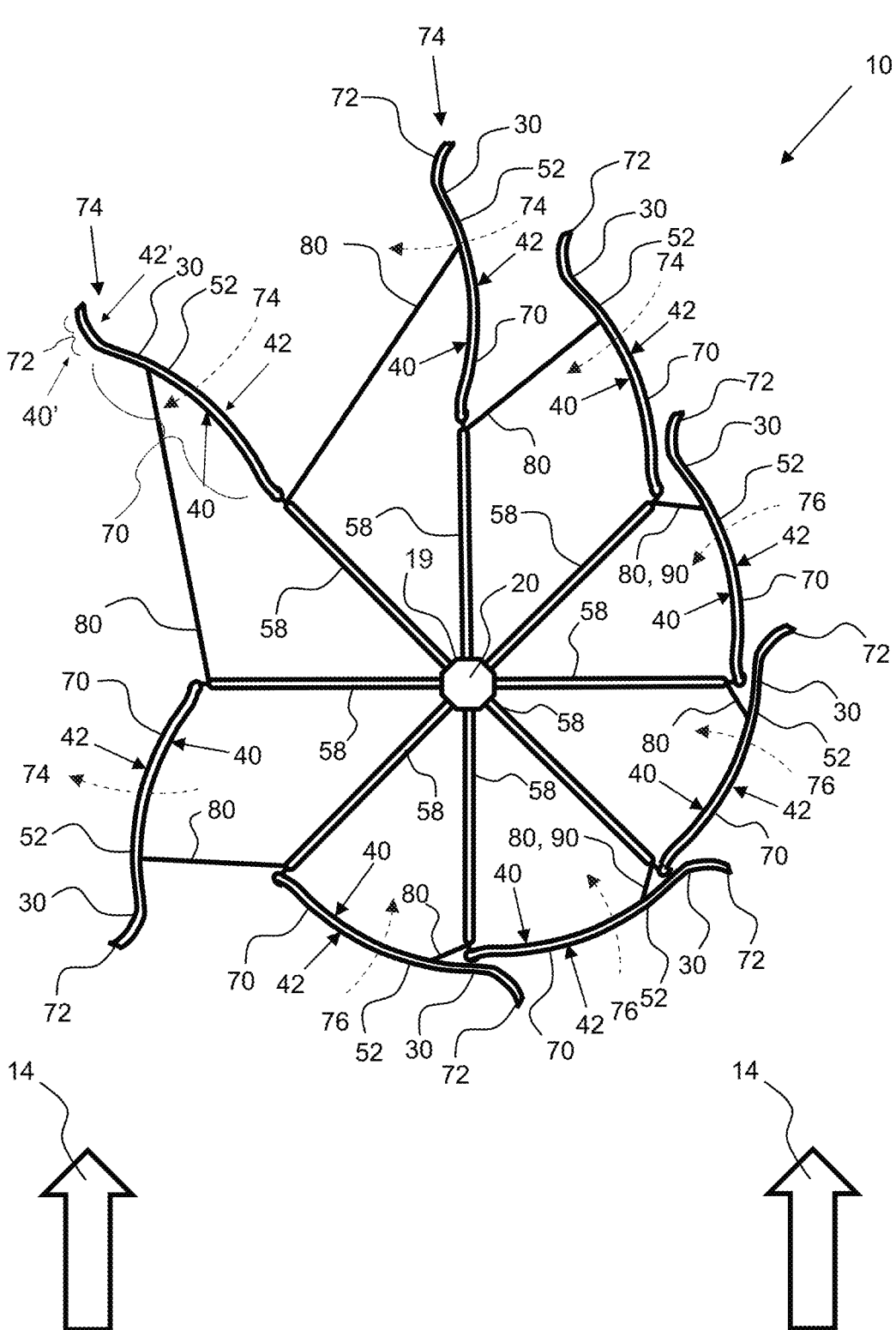
FIG. 2 shows a top view of a wind turbine with a strap serving as a retraction mechanism.

As shown in FIG. 2, eight sails 30 are carried on sail frames 52. The sail frames 52 are hingedly connected to outrigger connected portions 58, and the outrigger connected portions 58 is connected to the hub 20 of the wind turbine 10. The hub 20 may have an octagonal cross section so that the hub 20 has eight vertical faces 19. One outrigger 58 extends from each vertical face 19 of the hub 20. Each sail 30 has a main portion 70 and a sail extension 72 along an outer edge of the sail 30. Each main portion 70 has a concave front face 40 and a convex rear face 42. The sail extension 72 has a curvature opposite to the main portion 70 and has a convex front face 40' and a concave rear face 42'.

As shown in FIG. 2, four sails 30 are configured in open positions 74 and four sails 30 are configured in closed positions 76. In a closed position 76, the sail extension 72 of the sail 30 is configured adjacent to the main portion 70 of the neighboring sail. In an open position 74, the sail frame 52 is rotated relative to the outrigger connected portion 58 such that the sail extension 72 is moved away from the main portion 70 of the neighboring sail 30.

Wind 14 blows at the wind turbine 10 and is caught by the concave faces 40 of the sails 30. When wind 14 contacts the concave face 40 of a sail 30, the sail 30 is forced from a closed position 76 into an open position 74. The amount that the sail frame 52 rotates relative to the outrigger connected portion 58 when the sail 30 is in the open position 74 is limited by a retraction element 80, for example, a strap. As shown in FIG. 2, the retraction element 80 is connected between the sail frame 52 and the corresponding outrigger connected portion 58. When the sail 30 is in a closed position 76, the retraction element 80 may be compressed or may have slack. As the sail 30 is configured into an open position 74, the sail frame 52 pulls the strap 90 such that the strap extends and is in tension. At a certain point, the strap 90 reaches its maximum extension and does not allow the sail frame 52 to rotate relative to the outrigger connected portion 58 any further, thereby configuring the sail 30 in a maximum open position.

When configured in the maximum open position, the wind 14 may continue to contact the concave face 40 of the sail 30. Since the sail frame 52 is unable to rotate any further relative to the outrigger connected portion 58, the entire outrigger (the combination of the sail frame 52 and the outrigger connected portion 58) are biased tangentially to the hub 20 which causes the hub 20 to rotate about the center axis of rotation 21.

At a certain point in its rotation about the center axis of rotation 21, the sail 30 is positioned such that the wind 14 now contacts the convex rear face 42 of the sail 30 rather than the concave front face 40 of the sail 30. This forces the sail 30 back into a closed position 76. As other sails 30 are positioned into their maximum open positions and cause the hub 20 to rotate, the sails 30 in closed positions 76 rotate into positions where they are once again positioned such that the wind 40 may then contact the concave front faces 40 and forces the sails 30 into open the positions 74.

Figure 3:
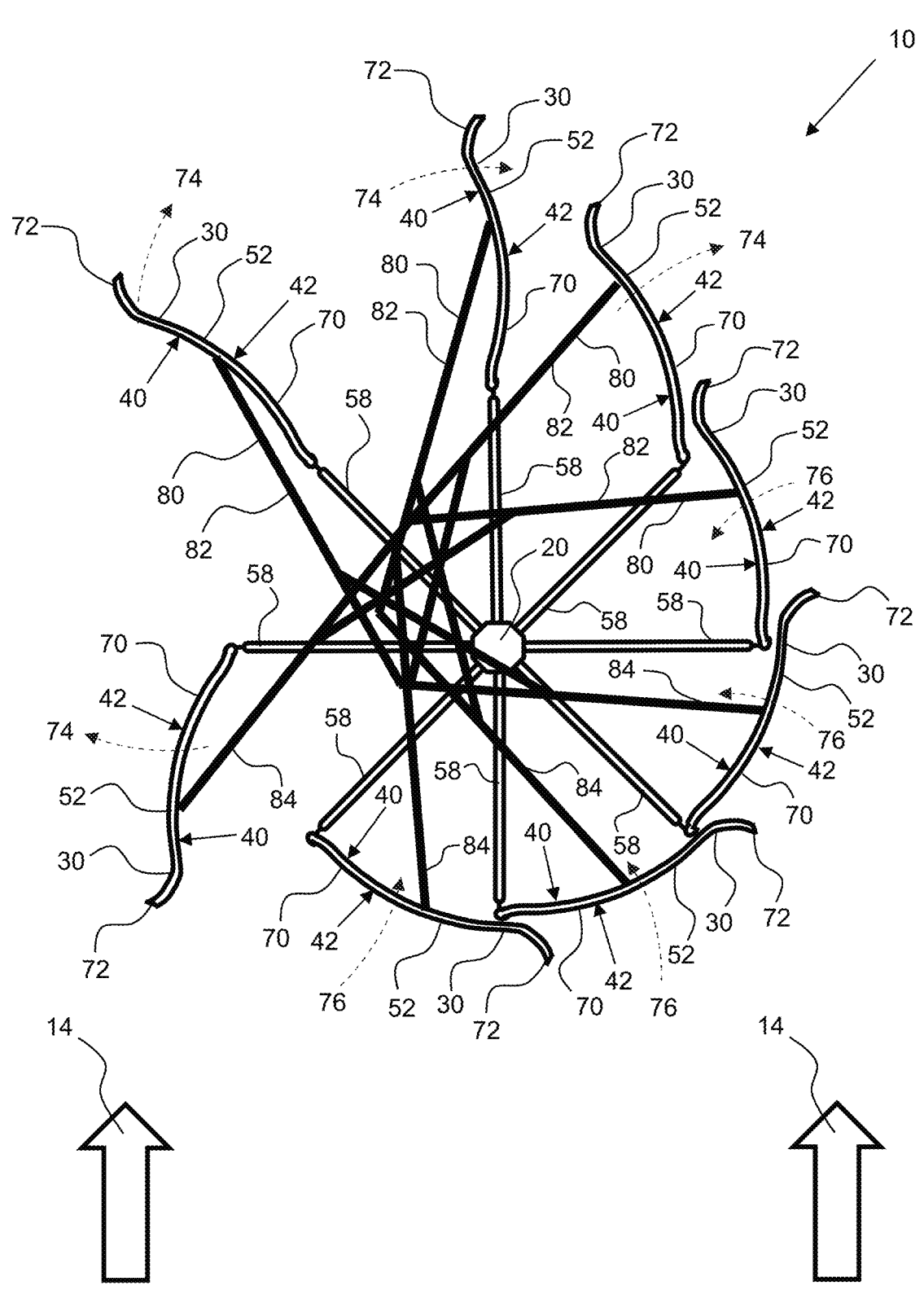
FIG. 3 shows a top view of a wind turbine with a retraction mechanism having a first retraction portion and second retraction portion.

As shown in FIG. 3, eight sails 30 with similar designs to those shown in FIG. 2 are connected to the hub 20 of a wind turbine 10 by sail frames 52 hingedly connected to the outrigger connected portions 58. However, as shown in FIG. 3 the sails 30 are pairs of sails each pair comprising a closed sail 30 and an open sail 30. Each sail 30 is resides opposite its corresponding sail 30. The sail frame 52 of each sail 30 is connected to the sail frame 52 of the opposite sail 30 by a retraction element 80 comprising a first retraction portion 82 connected to a second retraction portion 84 to form a rigid, bent bar. When the wind 14 contacts the concave front face 40 of the closed sail 30 and forces the closed sail 30 into an open position 74, the sail frame 52 of the closed sail 30 pulls on the first retraction portion 82, which pulls on the second retraction portion 84, which pulls on the sail frame 52 of the open sail 30 forcing the open sail 30 into a closed position 76. Likewise, when the wind 14 contacts the convex face 42 of the closed sail 30 and forces the closed sail 30 into a closed position 76, the sail frame 52 of the closed sail 30 pushes on the first retraction portion 82, which pushes on the second retraction portion 84, which pushes on the sail frame 52 of the open sail 30 forcing the open sail 30 into an open position 74. Therefore, the opening and closing of the sails 30 is caused both by the wind and by the connection of the sails 30 to one another by the retraction element 80.

The sails are limited in the amount they may open by the retraction element 80. As shown in FIG. 3, when the sail 3 is in a closed position 76, its sail extension 72 contacts the main portion 70 of a neighboring sail, preventing the sail 30 from closing any further. Since the retraction element 80 that connects the sail 30 to its respective sail 30 is a rigid angled bar, the limited closing of the open sail 30 corresponds to limited opening of its respective closed sail 34, thereby causing the respective closed sail 34 to say in a maximum open position. In the maximum open position, the wind 14 may continue to contact the concave face 40 of the closed sail 34. Since the sail frame 52 of the closed sail 34 is unable to rotate any further relative to the outrigger connected portion 58, the entire outrigger (the combination of the sail frame 52 and the outrigger connected portion 58) are biased tangentially to the hub 20 which causes the hub 20 to rotate about the center axis of rotation 21.

Figure 4:
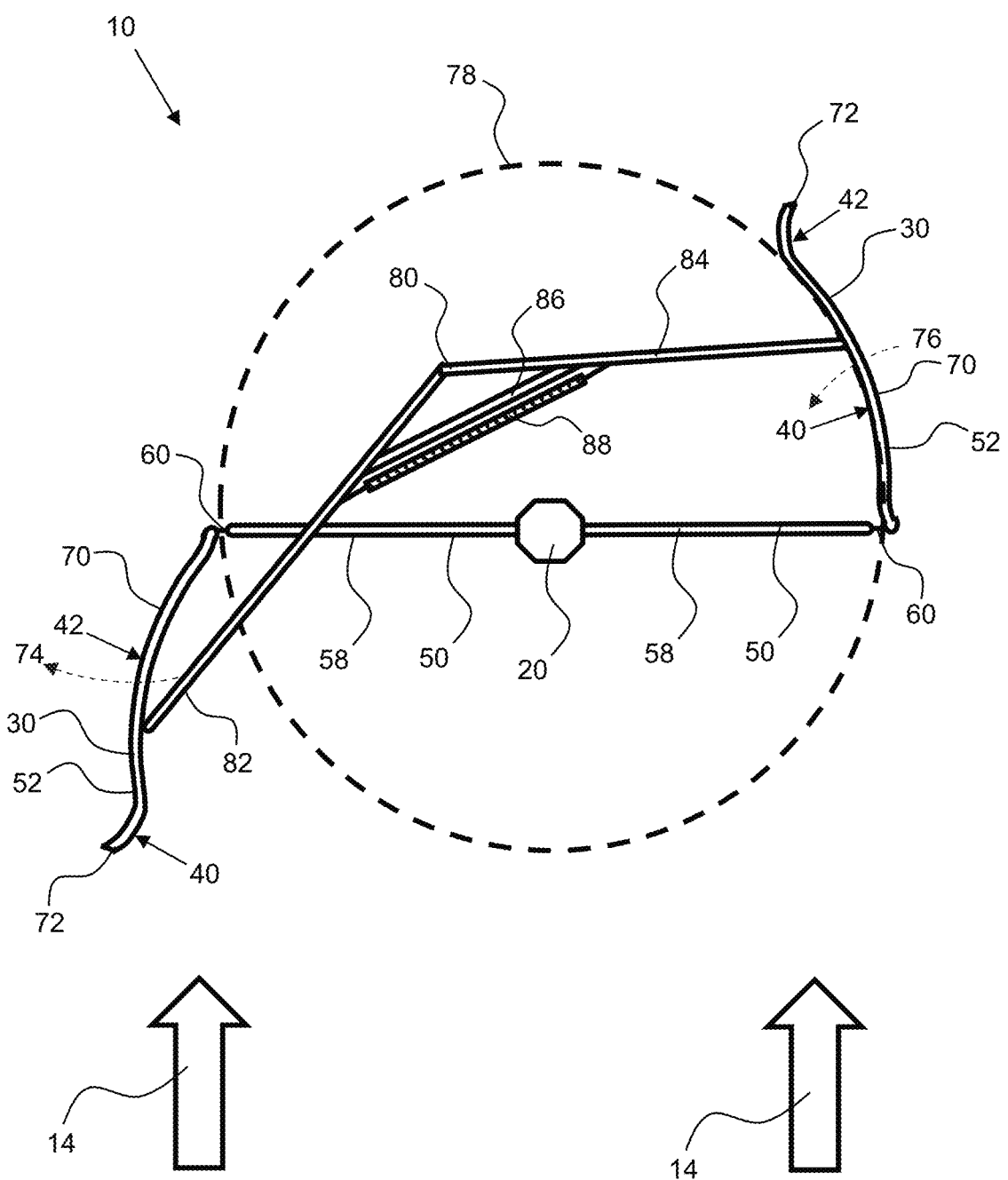
FIG. 4 shows a top view of a pair of sails with a first sail in an open position and a second sail in a closed position.
Figure 5:
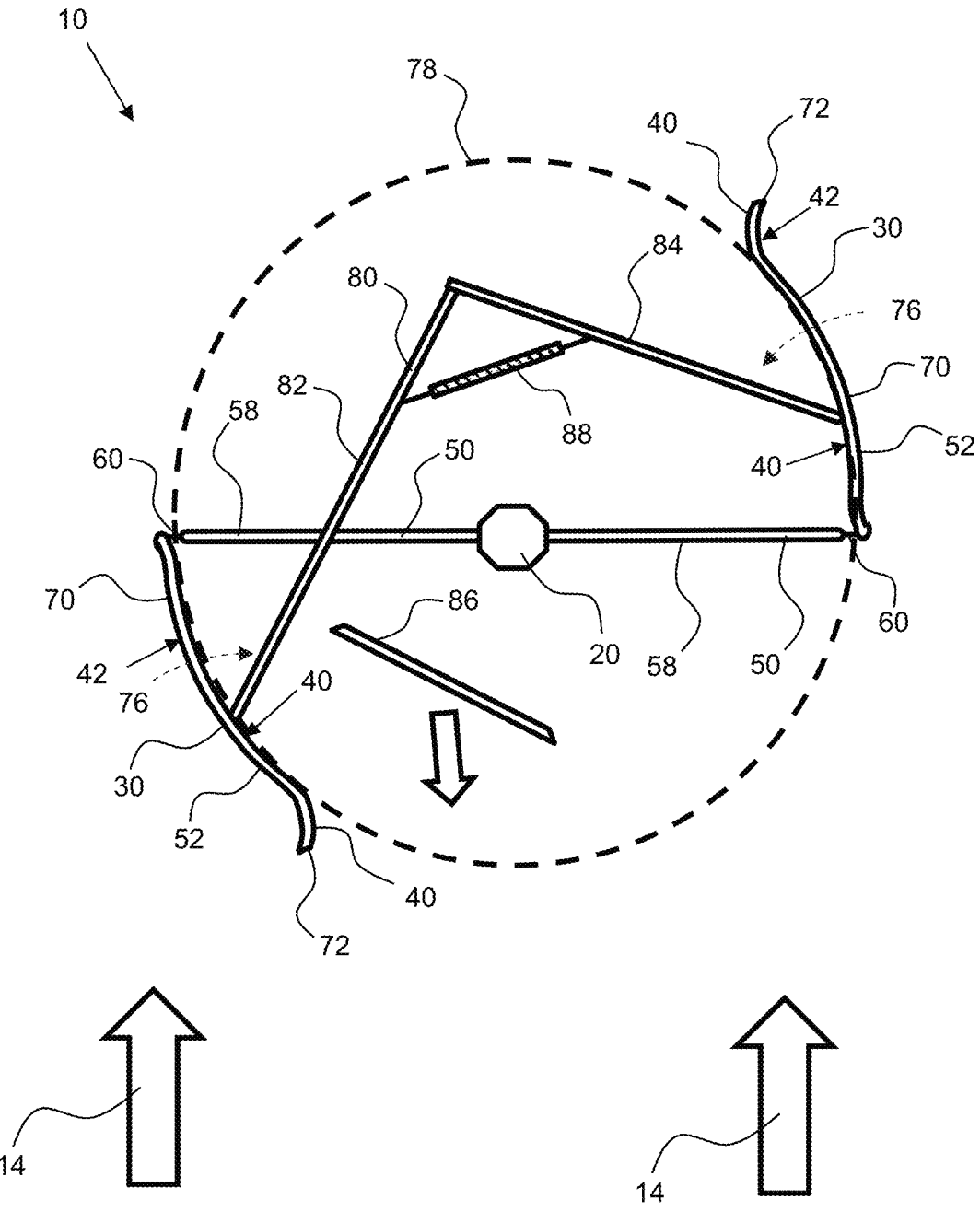
FIG. 5 shows a pair of sails with a first sail and a second sail both in a closed position.

As shown in FIGS. 4 and 5, the closed sail 30 and the open sail 30 are configured opposite one another. Each the closed sail 30 and the open sail 30 are connected to the hub 20 of a wind turbine 10 by an outrigger 50. The sail frame 52 of each outrigger 50 is connected to the outrigger connected portion 58 by a hinge 60, which allows the sail frame 52 to rotate relative to the outrigger connected portion 58. A retraction element 80 is configured between the closed sail 30 and the open sail 30. A first retraction portion 82 is connected to the sail frame 52 of the closed sail 30. A second retraction portion 84 is connected to the sail frame 52 of the open sail 30. The first retraction portion 82 is hingedly connected to the second retraction portion 84 so that the first retraction portion 82 and second retraction portion 84 may rotate relative to one another. A drop bar 86 is configured between the first retraction portion 82 and the second retraction portion 84 to prevent the first retraction portion 82 and the second retraction portion 84 from rotating towards one another.

A tension element (for example a spring) 88 is also configured between the first retraction portion 82 and the second retraction portion 84. The tension element 88 may draws the first retraction portion 82 and the second retraction portion 84 to rotate towards one another, thereby holding the drop bar 86 in place due to the contact between the drop bar 86 and the first retraction portion 82 and between the drop bar 86 and the second retraction portion 84. The tension element 88 may extend and allow the first retraction portion 82 and the second retraction portion 84 to rotate away from one another. When the first retraction portion 82 and the second retraction portion 84 rotate away from one another, the friction force between the drop bar 86 and the first retraction portion 82 and between the drop bar 86 and the second retraction portion may decrease enough for the drop bar 86 to be released from between the first retraction portion 82 and the second retraction portion 84. Without the drop bar 86 preventing the first retraction portion 82 and the second retraction portion 84 from rotating towards one another, the tension element 88 draws the first retraction portion 82 and the second retraction portion 84 to rotate towards one another, thereby configuring both the closed sail 30 and the open sail 30 into closed positions 76.

As shown in FIG. 5, the drop bar 86 is released from between the first retraction portion 82 and the second retraction portion 84. The direction of release of the drop bar 86 shown in FIG. 5 is not intended to limit the drop bar 86 to being released in that particular direction. The drop bar 86 may fall to the ground when it is released from between the first retraction portion 82 and the second retraction portion 84. Alternatively, the drop bar 86 may be hingedly connected to the first retraction portion 82. When the drop bar is released from between the first retraction portion 82 and the second retraction portion 84, the drop bar 86 may release its contact with the second retraction portion 84 and may rotate relative to the first retraction portion 82. In this manner, the drop bar 86 is still attached to the first retraction portion 82 so that it is easier to re-configure between the first retraction portion 82 and the second retraction portion 84.

When the closed sail 30 and/or open sail 30 are in a closed position 76, the curvature of the main portion 70 of the sail is aligned with a diameter of rotation 78 that runs in a circular pattern horizontally about the center axis of rotation 21. The sail extension 72 of the sail protrudes from the diameter of rotation 78. In this manner the wind turbine 10 is still able to rotate due to the force of wind 14 when all sails are configured in closed positions 76 since the wind 14 is able to contact the concave faces 40 of the sails at the sail extensions 72.

Figure 6:
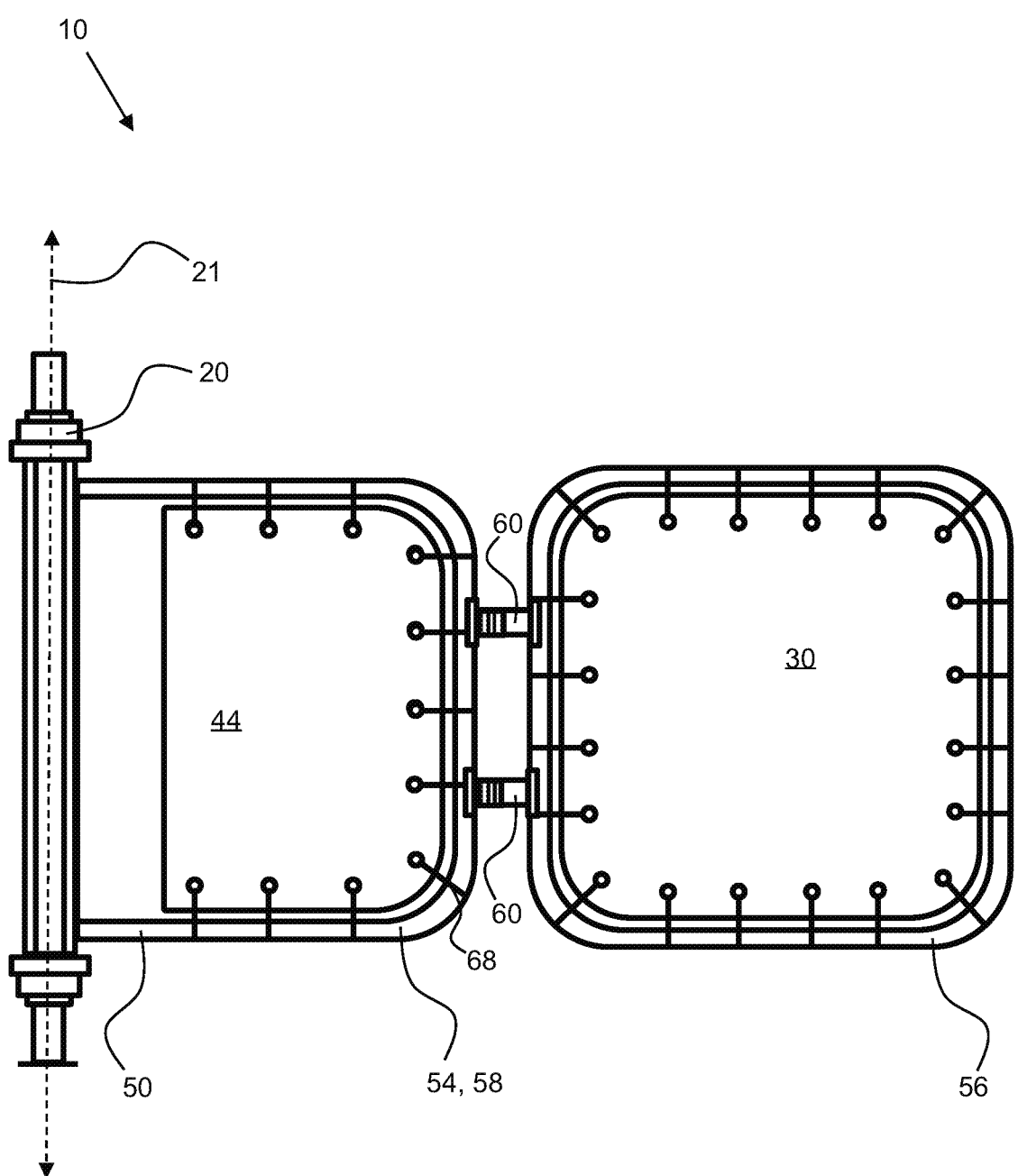
FIG. 6 shows a front view of a sail with an inner sail and an outer sail.

As shown in FIG. 6, an additional inner sail 44 may be attached to the outrigger connected portion 58 of an outrigger 50. The hinges 60 allow the sail 30 to pivot relative to the inner sail 44 in a direction perpendicular to the center axis of rotation 21.

Figure 7:
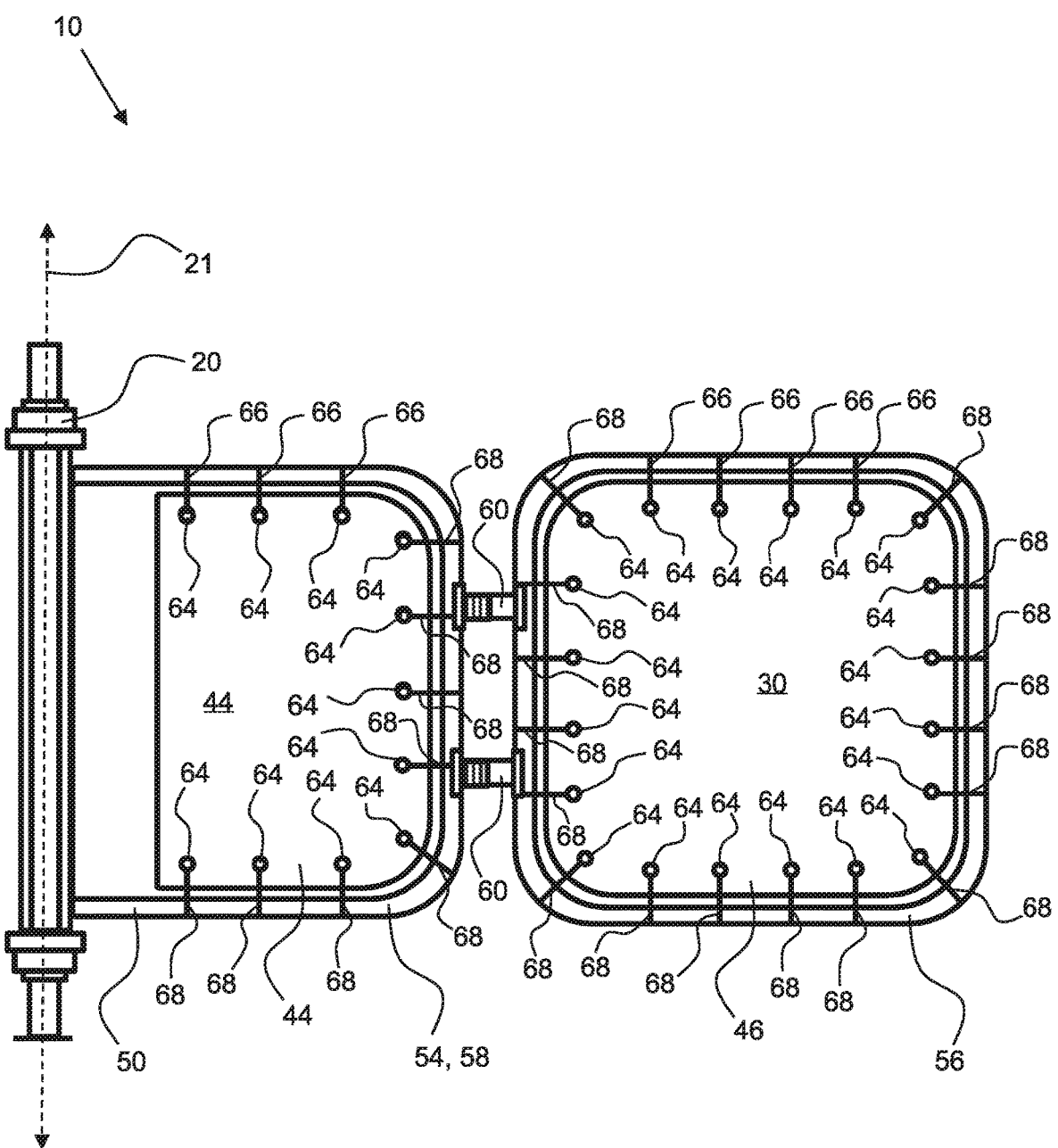
FIG. 7 shows a front view of the sail with no outrigger support rings.

As shown in FIG. 7, the inner sail 44 and sail 30 each have a plurality of grommets 64 that are configured along perimeters of the respective sails 44 and 30. A plurality of clips 66 and 68 connect the grommets 64 to their respective sail frames 54 and 56. Pressure clips 68 are configured on three sides of the outer sail frame 56 and on two sides of the inner sail frame 54. When the wind reaches a certain force, the pressure clips 68 release their respective grommets 64 to release their respective sail portion from their respective sail frame. Non-pressure clips 66 are configured on one side each of the outer sail frame 56 and inner sail frame 54. The non-pressure clips 66 remain connected to the grommets 64 even in high winds, thereby allowing the inner sail 44 and outer sail 46 to "flap" without catching the wind and rotating the outrigger 50 about the center axis of rotation 21. In this manner, the wind turbine 10 provides a safety feature to prevent damage to the wind turbine 10 in high winds and to prevent danger to nearby beings or structures in high winds.

Figure 8:
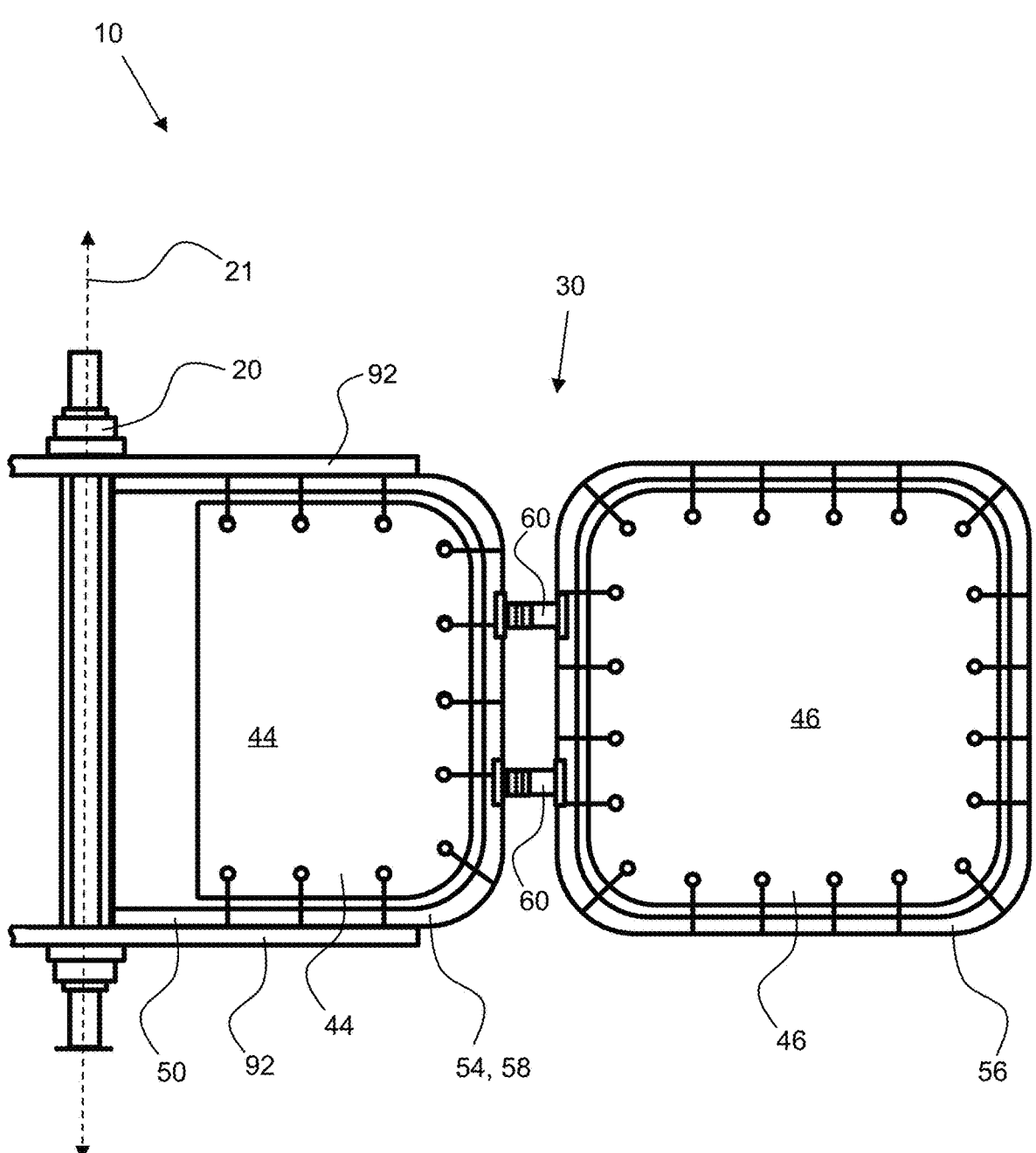
FIG. 8 shows a front view of a sail with two outrigger support rings attached to an inner sail frame.

As shown in FIG. 8, two outrigger support rings 92 are configured each on opposite sides of the inner sail frame 54 of an outrigger 50. The outrigger support ring 92 may connect all outrigger connected portions 58 to one another. Only one outrigger support ring 92 is shown in FIG. 8 due to the view of FIG. 8. The outrigger support rings 92 may be fixed to the outrigger connected portions 58 of each outrigger 50. This may provide structural support for the wind turbine 10 so that the outrigger connected portions 58 do not bend or break in high winds. Since the outrigger support rings 92 are fixed to the outrigger connected portions 58, the outrigger support rings 92 rotate about the center axis of rotation 21 with the outriggers 50. Though two outrigger support rings 92 are shown in FIG. 8, any number of outrigger support rings 92 may be used. Multiple outrigger support rings 92 of different diameters may be configured concentrically to one another to further increase the structural support of the outriggers 50.

Figure 9:
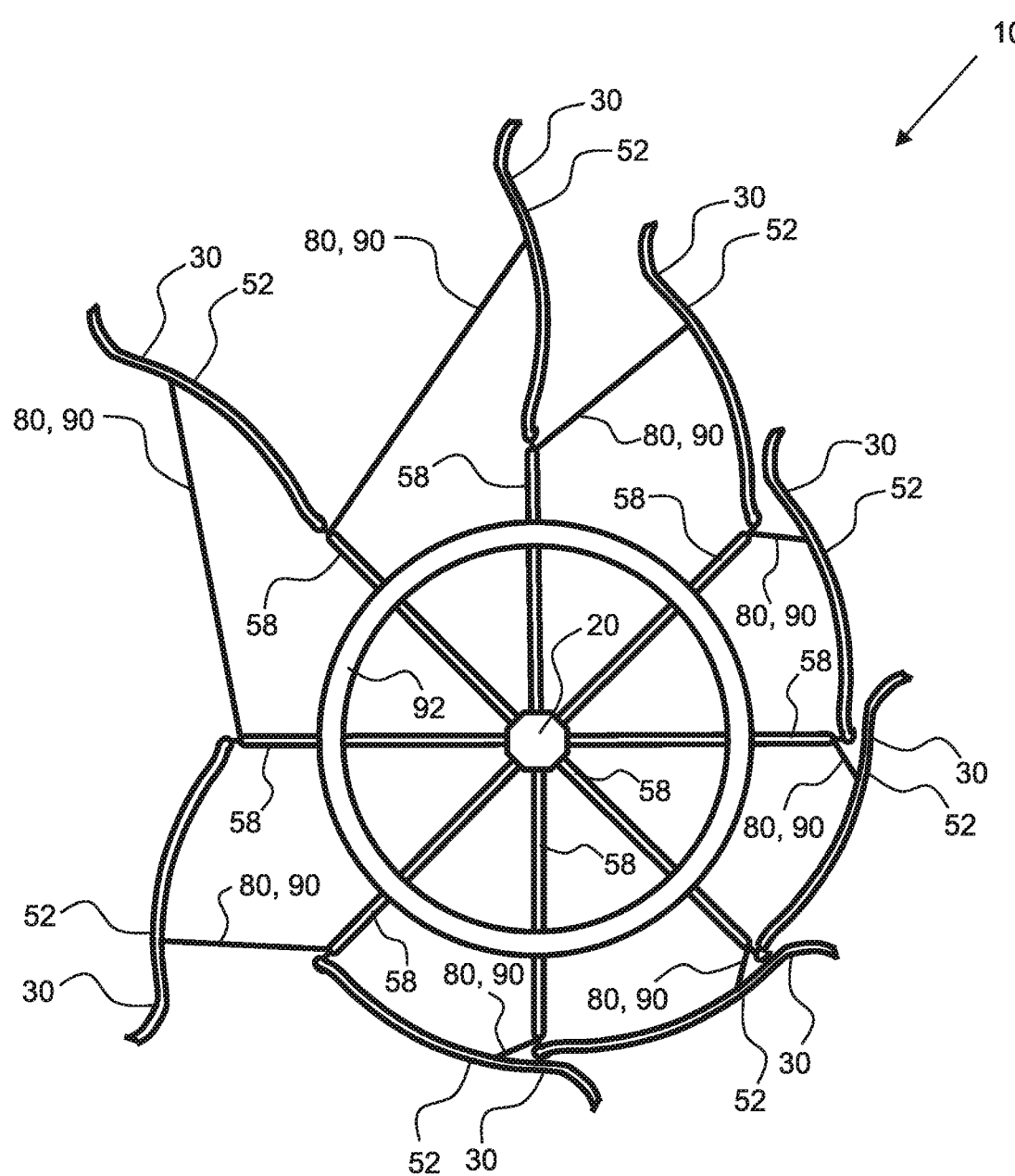
FIG. 9 shows a top view of a wind turbine with an outrigger support ring.

FIG. 9 is a top view of the wind turbine 10 with the outrigger support ring 92 configured about the inner sail 44.

Figure 10:
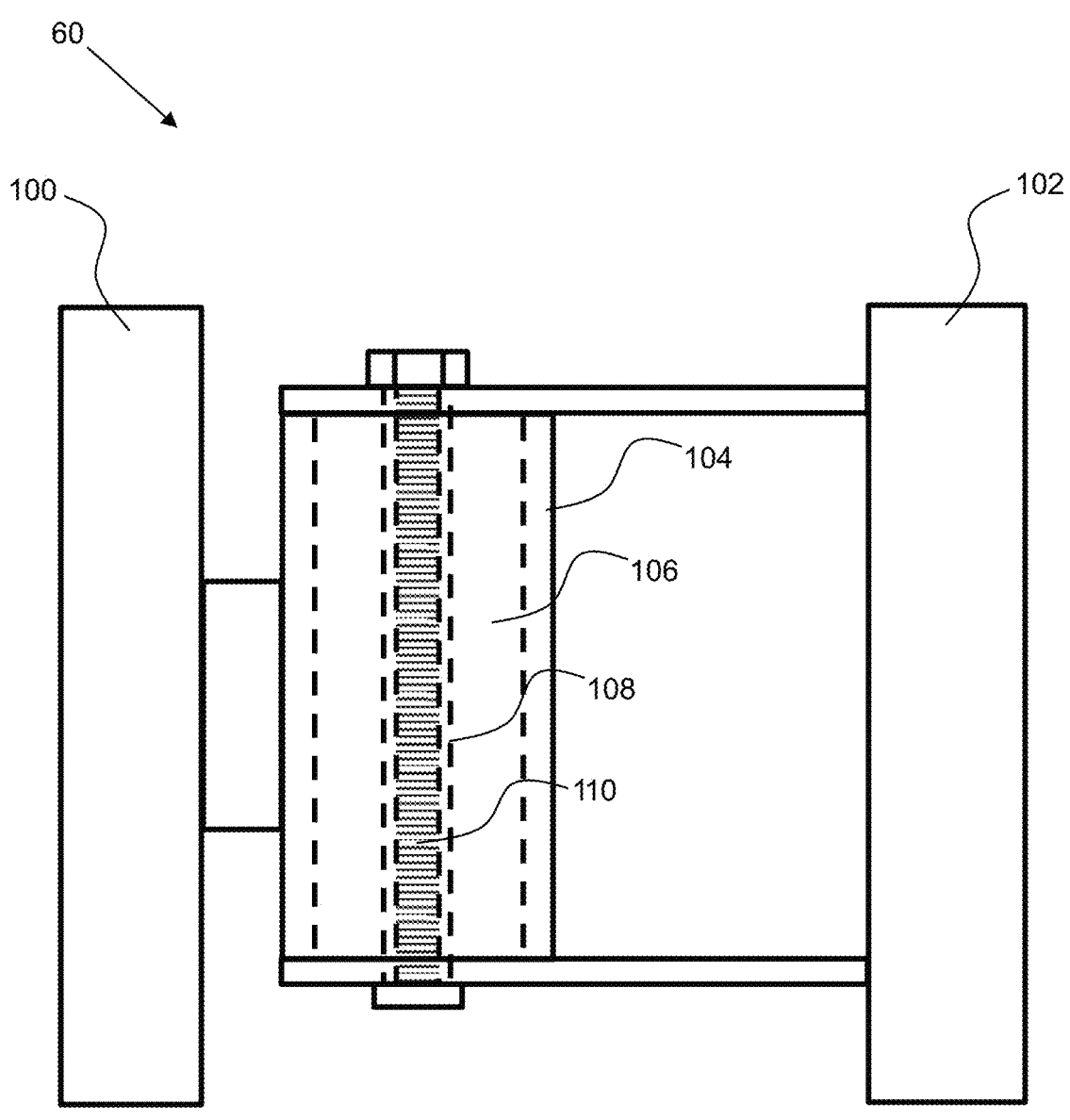
FIG. 10 shows a front view of a hinge of a wind turbine.

As shown in FIG. 10, a hinge 60 may include an outrigger connected portion bracket 100 that connects to the outrigger connected portion of a wind turbine. The hinge 60 may also include a sail frame bracket 102 that connects to the sail frame of a wind turbine. The outrigger connected portion bracket 100 is fixed to a hinge sleeve 104. The sail frame bracket 102 is rotatably connected to the hinge sleeve 104 by a hinge bolt 110. The rotatable connection between the sail frame bracket 102 and the hinge sleeve 104 allows the sails of the wind turbine to move between open and closed positions. A hinge bushing 106 is configured within the hinge sleeve 104. A hinge bushing hole 108 extends through the hinge bushing 106. The hinge bolt 110 is configured through the hinge bushing hole 108 to rotatably connect the sail frame bracket 102 to the hinge sleeve 104. The coefficient of friction between the hinge bolt 110 and the hinge bushing 106 is less than the coefficient of friction between the hinge bolt 110 and the hinge sleeve 104. Since the hinge bushing 106 is configured between the hinge bolt 110 and an inner wall of the hinge sleeve 104, the hinge bushing 106 may serve to reduce the friction of the hinge when the sails of the wind turbine move between open and closed positions and thereby cause the sail frame bracket 102 to rotate relative to the hinge sleeve 104.

The horizontal orientation of the sails shown in the figures allows the wind turbine 10 to operate when wind is blowing from any direction, so long as the wind blows at least partially horizontally. As shown in FIGS. 2 and 3, the wind 14 is blowing towards the top of the page. However, due to the circular arrangement of the sails, the wind 14 would still contact the concave face 40 of at least one sail when the wind 14 is blowing from any at least partially horizontal direction.

While the invention herein disclosed has been described by means of specific embodiments and applications thereof, numerous modifications and variations could be made thereto by those skilled in the art without departing from the scope of the invention set forth in the claims.

I claim:

1. A wind turbine comprising:

a hub;

a center axis of rotation configured through the hub;

an outrigger attached to the hub;

a sail frame attached to the outrigger, the sail frame attached to extend directly from the outrigger in an open position and only fold in one direction to a closed position towards the outrigger;

at least one sail attached to the sail frame, the sail comprising:

a front face; and a rear face; and a generator connected to be rotated by the hub, wherein wind contacts the front face of the at least one sail to open the at least one sail from the closed position to the open position;

wherein the wind causes the at least one sail to rotate about the center axis of rotation, thereby causing the hub to rotate, thereby powering the generator; and wherein at a point in the rotation of the at least one sail, the wind contacts the front face of the at least one sail to close the at least one sail from the open position to the closed position; and a plurality of grommets configured about a perimeter of the at least one sail;

a plurality of non-pressure clips that connect some of the plurality of grommets to the sail frame; and a plurality of pressure clips that connect some of the plurality of grommets to the sail frame, wherein when the wind contacts the front face of the at least one sail with a sufficient force, the pressure clips are configured to disconnect from their respective grommets while the non-pressure clips remain connected to their respective grommets, thereby allowing the at least one sail to flap on the sail frame without causing rotation of the hub.

2. The wind turbine of claim 1, wherein:

the center axis of rotation is configured vertically; and a wind having at least some horizontal component causes the wind turbine to rotate generating electricity.

3. The wind turbine of claim 1, further comprising a retraction mechanism connected to the sail frame, wherein the retraction mechanism is in tension when the sail is in the open position; and wherein the retraction mechanism aids in closing the sail from the open position to the closed position.

4. The wind turbine of claim 1, further including an inner sail attached to the outrigger and residing closer to the hub than the sail, wherein both the sail and the inner sail include a concave front face and a convex rear face.

5. The wind turbine of claim 1, further including hinges rotatably connecting the sail frame to the outrigger.

6. The wind turbine of claim 5, wherein the hinge comprises a hinge bushing reducing friction of the hinge when the sail frame rotates relative to the outrigger.

7. The wind turbine of claim 5, further comprising at least one outrigger support ring, wherein the at least one outrigger support ring is fixed to each outrigger.

8. The wind turbine of claim 1, wherein the at least one sail comprises:

a main portion comprising a main portion curvature; and a sail extension having a sail extension curvature opposite to the main portion curvature, wherein when the at least one sail is configured in the closed position, the main portion is configured along a diameter of rotation, and the sail extension protrudes from the diameter of rotation.

9. The wind turbine of claim 8, wherein when the at least one sail is configured in the closed position, the protrusion of the sail extension from the diameter of rotation allows the wind to contact a concave front face of the at least one sail in the closed position, wherein the wind causes the at least one sail to rotate about the center axis of rotation, thereby causing the hub to rotate, thereby powering the generator.

10. A wind turbine comprising:

a hub;

a center axis of rotation configured through the hub;

at least one pair of sails comprising:

a first sail;

a second sail;

outriggers connecting the first sail and the second sail to the the hub, the outriggers each comprising a sail frame; and a generator, wherein the first sail and the second sail each comprise a concave face and a convex face, wherein wind contacts the concave face of the first sail to open the first sail from a closed position to an open position, wherein the wind causes the first sail to rotate about the center axis of rotation, thereby causing the hub to rotate, thereby powering the generator, wherein at a point in the rotation of the first sail, the wind contacts the convex face of the first sail to close the first sail from the open position to the closed position; and a plurality of grommets configured about a perimeter of at least one of the sails;

a plurality of non-pressure clips that connect some of the plurality of grommets to the sail frame; and a plurality of pressure clips that connect some of the plurality of grommets to the sail frame, wherein when the wind contacts the front face of the at least one sail with a sufficient force, the pressure clips are configured to disconnect from their respective grommets while the non-pressure clips remain connected to their respective grommets, thereby allowing the at least one sail to flap on the sail frame without causing rotation of the hub.

11. The wind turbine of claim 10, wherein the center axis of rotation is configured vertically, and wherein the wind blows at least partially horizontally.

12. The wind turbine of claim 10, further comprising a retraction mechanism connecting the sail frame of the first sail to the sail frame of the second sail, wherein when the first sail is opened into the open position, the sail frame of the first sail pulls on the retraction mechanism, wherein the retraction mechanism pulls on the sail frame of the second sail, thereby causing the second sail to close into the closed position.

13. The wind turbine of claim 12, wherein the retraction mechanism comprises:

a first retraction portion;

a second retraction portion rotatably connected to the first retraction portion;

a drop bar configured between the first retraction portion and the second retraction portion, wherein the drop bar is configured to selectively prevent the first retraction portion and the second retraction portion from rotating towards one another; and a tension spring configured between the first retraction portion and the second retraction portion, wherein the tension spring biases the first retraction portion and the second retraction portion to rotate towards one another, wherein when the wind contacts the concave face of the first sail with a certain force, the first sail opens past the open position, causing the first retraction portion to rotate away from the second retraction portion to release the drop bar, wherein upon release of the drop bar, the drop bar no longer prevents the first retraction portion and the second retraction portion from rotating towards one another, wherein the first retraction portion and the second retraction portion are configured to rotate towards one another via the bias of the tension spring, thereby moving the first sail and the second sail into the closed position.

14. The wind turbine of claim 10, wherein each the first sail and the second sail further comprise:

an outer sail; and an inner sail configured on the same outrigger as the outer sail and configured closer to the hub than the outer sail, wherein both the outer sail and the inner sail comprise a concave face and a convex face, wherein each outrigger comprises:

an outer sail frame; and an inner sail frame.

15. The wind turbine of claim 10, wherein each outrigger further comprises:

a hinge; and an outrigger connected portion, wherein the hinge rotatably connects the sail frame to the outrigger connected portion.

16. The wind turbine of claim 15, wherein the hinge comprises a hinge bushing that reduces the friction of the hinge when the sail frame rotates relative to the outrigger connected portion.

17. The wind turbine of claim 15, further comprising at least one outrigger support ring, wherein the at least one outrigger support ring is fixed to each outrigger connected portion.

18. The wind turbine of claim 10, wherein the first sail and the second sail each comprise:

a main portion comprising a main portion curvature; and a sail extension comprising a sail extension curvature, wherein when either the first sail or second sail are configured in the closed position, the respective main portion is configured along a diameter of rotation, and the respective sail extension protrudes from the diameter of rotation.

19. The wind turbine of claim 18, wherein when the either the first sail or the second sail are configured in the closed position, the protrusion of the respective sail extension from the diameter of rotation allows the wind to contact the concave face of the respective sail at the respective sail extension, wherein the wind causes the respective sail to rotate about the center axis of rotation, thereby causing the hub to rotate, thereby powering the generator.

\* \* \* \* \*